United States Patent
Gruel

(10) Patent No.: US 7,877,997 B2
(45) Date of Patent: Feb. 1, 2011

(54) WASTEGATE CONTROL SYSTEM BASED ON VARIABLE VALVE ACTUATION

(75) Inventor: Christopher Michael Gruel, Edwards, IL (US)

(73) Assignee: Caterpillar Inc., Peoria, IL (US)

(*) Notice: Subject to any disclaimer, the term of this patent is extended or adjusted under 35 U.S.C. 154(b) by 519 days.

(21) Appl. No.: 12/071,948

(22) Filed: Feb. 28, 2008

(65) Prior Publication Data

US 2009/0217661 A1    Sep. 3, 2009

(51) Int. Cl.
F02D 23/00    (2006.01)
F15B 13/16    (2006.01)
F16K 31/12    (2006.01)

(52) U.S. Cl. .................... 60/602; 701/102; 91/361
(58) Field of Classification Search ........... 60/600–603, 60/612; 701/102; 91/361
See application file for complete search history.

(56) References Cited

U.S. PATENT DOCUMENTS

| | | | |
|---|---|---|---|
| 2,283,175 A | 5/1942 | Berger | 60/602 |
| 2,560,210 A | 7/1951 | Browne | 60/602 |
| 2,562,742 A | 7/1951 | Rowe et al. | 60/600 |
| 2,565,482 A | 8/1951 | Dolza et al. | 60/601 |
| 2,888,799 A | 6/1959 | Buchi | |
| 3,233,403 A | 2/1966 | MacInnes et al. | 60/600 |
| 3,389,553 A * | 6/1968 | Hardy et al. | 60/602 |
| 3,611,711 A | 10/1971 | Mueller | 60/600 |
| 4,174,617 A | 11/1979 | Jalali-Karchay | 60/602 |
| 4,387,572 A | 6/1983 | Richardson et al. | 60/602 |
| 4,469,078 A | 9/1984 | Speer et al. | 60/600 |
| 4,483,174 A | 11/1984 | Goodfellow | |
| 4,918,923 A | 4/1990 | Woollenweber et al. | |
| 4,926,636 A * | 5/1990 | Tadokoro et al. | 60/602 |
| 5,079,921 A | 1/1992 | McCandless et al. | 60/602 |
| 5,850,738 A * | 12/1998 | Hayashi | 60/602 |
| 5,873,248 A * | 2/1999 | Houtz | 60/602 |
| 5,974,801 A * | 11/1999 | Houtz | 60/602 |
| 6,112,523 A | 9/2000 | Kamo et al. | |
| 6,637,202 B2 | 10/2003 | Koch et al. | 60/602 |
| 6,655,141 B1 | 12/2003 | Faletti | 60/602 |
| RE38,671 E * | 12/2004 | Kahlon et al. | 60/605.1 |
| 6,898,933 B2 | 5/2005 | Klingseis | 60/602 |
| 7,520,260 B2 * | 4/2009 | Nakamura et al. | 123/299 |
| 2007/0289302 A1 | 12/2007 | Funke et al. | 60/602 |
| 2009/0178551 A1* | 7/2009 | Garcia et al. | 91/361 |

* cited by examiner

*Primary Examiner*—Thai Ba Trieu
(74) *Attorney, Agent, or Firm*—Finnegan, Henderson, Farabow, Garrett & Dunner LLP

(57) ABSTRACT

A hydraulically operated wastegate valve control system for a turbocharged internal combustion engine is disclosed. The control system includes a hydraulically operated wastegate valve configured to permit exhaust to bypass a turbine section. A first sensor is configured to sense an actuation of at least one of an intake valve and an exhaust valve by a variable valve actuation mechanism, and a second sensor is configured to detect a turbocharger speed. A controller is configured to deliver a control signal based on a predetermined relationship between the actuation of at least one of the intake and exhaust valves by the variable valve actuation mechanism and the turbocharger speed, and an operator is configured to receive the control signal and control actuation of the hydraulically operated wastegate valve based on the control signal.

20 Claims, 3 Drawing Sheets

WASTEGATE CONTROL SYSTEM BASED ON VARIABLE VALVE ACTUATION

TECHNICAL FIELD

The present disclosure is directed to a hydraulically operated wastegate control system, and more particularly, a control system based on variable valve actuation.

BACKGROUND

Turbocharged engines of the type used, for example, in off-highway and on-highway trucks, often employ wastegate valves for controlling the turbocharger speed and thus the boost air pressure delivered to the intake manifold of the engine. The wastegate valve is normally disposed in the exhaust system of the engine and controls the speed of the turbocharger by modifying the volume of exhaust gasses directed to the turbine section of the turbocharger. Typically, the wastegate valve may be pneumatically actuated based on boost air pressure. Boost air pressure is directly supplied from the turbocharger compressor outlet, charge ducts, or intake manifold to the wastegate valve. As boost air pressure increases, its force gradually acts against an energy storage device configured to urge the wastegate valve closed, thereby variably opening the wastegate valve based on air pressure.

Alternatively, turbocharged engines employ engine oil instead of boost air pressure to actuate wastegate valves. A control system employing engine oil for actuating a wastegate valve is described in U.S. Pat. No. 5,079,921 (the '921 patent) to McCandless et al., issued on Jan. 14, 1992. The '921 patent describes an exhaust back pressure control system for an internal combustion engine, in particular, a diesel engine, to improve engine warm up upon starting in a cold environment. The control system includes a valve assembly mounted at a turbine discharge outlet of a turbocharger. The position of the valve assembly is controlled by a microcomputer through an electrically controlled hydraulic valve using engine lubricating oil pressure to provide a controlled increase of exhaust back pressure on the engine during cold start up periods, thereby decreasing the warm-up period for the engine. The valve is selectively operated based on a signal from the microcomputer, the signal being calculated from various engine parameters, such as, coolant temperature, ambient temperature, engine speed, engine load, and time since engine start.

Although the control system of the '921 patent may variably actuate a wastegate valve in response to various engine parameters by employing a fluid other than boost air pressure, it may have limitations. For example, the control system of the '921 patent may not account for variations in boost air pressure that may be necessary in connection with a variable valve actuation system. The control system of the '921 patent may not satisfactorily provide wastegate valve control in response to variable valve actuation parameters in an internal combustion engine employing a variable valve actuation system.

The hydraulically operated wastegate valve control system of the present disclosure is directed towards improvements to the existing technology.

SUMMARY OF THE DISCLOSURE

One aspect of the present disclosure is directed to a hydraulically operated wastegate valve control system for a turbocharged internal combustion engine including a compressor section associated with an intake valve for intake air, a turbine section associated with an exhaust valve for engine exhaust, and a variable valve actuation mechanism configured to variably actuate at least one of the intake valve and the exhaust valve. The control system may include a hydraulically operated wastegate valve configured to permit engine exhaust to bypass the turbine section, a first sensor configured to sense an actuation of at least one of the intake valve and the exhaust valve by the variable valve actuation mechanism and generate a first signal in response thereto, a second sensor configured to detect a turbocharger speed and generate a second signal in response thereto, a controller associated with the first sensor and the second sensor, the controller configured to deliver a control signal based on a predetermined relationship between the actuation of at least one of the intake valve and the exhaust valve by the variable valve actuation mechanism and the turbocharger speed, and an operator configured to receive the control signal and control an actuation of the hydraulically operated wastegate valve based on the control signal.

Another aspect of the present disclosure is directed to a method for controlling turbocharger speed of a turbocharged internal combustion engine, the engine including a compressor section associated with an intake valve for intake air, a turbine section associated with an exhaust valve for engine exhaust, and a variable valve actuation mechanism configured to variably actuate at least one of the intake valve and the exhaust valve. The method may include sensing actuation of at least one of the intake valve and the exhaust valve by the variable valve actuation mechanism and generating a first signal in response thereto, detecting turbocharger speed and generating a second signal in response thereto, generating a control signal based on a predetermined relationship between the first signal and the second signal, and controlling actuation of a hydraulically operated wastegate valve based on the control signal.

DETAILED DESCRIPTION

Figure 1:
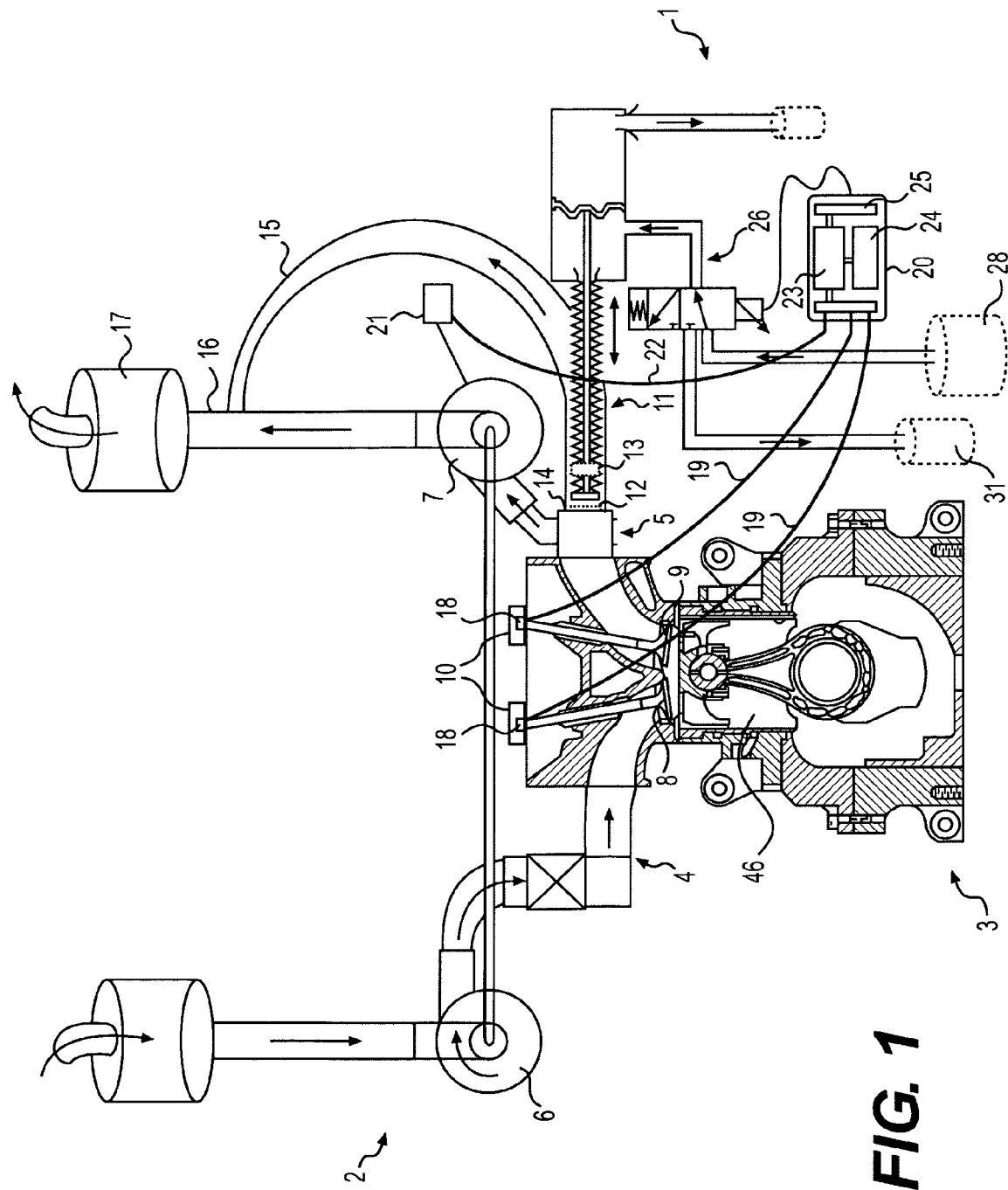
FIG. 1 is a schematic drawing of a turbocharged internal combustion engine having variable valve actuation, a hydraulically operated wastegate valve, and a control system for controlling the wastegate valve according to an exemplary disclosed embodiment.

With reference to the drawings and particularly FIG. 1, a hydraulically operated wastegate valve control system 1 for controlling the speed of a turbocharger 2, and thus, the boost pressure of an internal combustion engine 3 having variable valve actuation is shown. Engine 3 may include an intake manifold 4 and an exhaust manifold 5 respectively connected to compressor 6 and turbine 7 sections of turbocharger 2. In this embodiment, one turbocharger 2 with a single compressor 6 is illustrated, but it will be understood that the number of turbochargers or the number of compressors could be one or more than one and still fall within the scope of this disclosure. Furthermore, expedients other than turbochargers, such as an engine driven supercharger or superchargers, may be employed.

Engine 3 may include a plurality of intake valves 8 (only one shown) and a plurality of exhaust valves 9 (only one shown) configured to be actuated and to control flow of the intake and exhaust gasses into and out of the combustion chamber 46. Diagrammatically illustrated variable valve actuation mechanism 10, configured to vary the open and closed positions of intake valve 8 and exhaust valve 9, may be employed. In particular, variable valve actuation mechanism 10 may alter the timing and duration of the opening and closing of the valves. It should be appreciated that a variety of known types of variable valve actuation mechanisms, such as, mechanical systems, electro-hydraulic systems, switching systems, camless systems, and camshaft phaser systems, may be capable of varying the timing and duration of open and closed positions of intake and exhaust valves for an internal combustion engine. The particular type of valve actuation mechanism that may be employed is beyond the scope of this disclosure. Any variable valve actuation mechanism capable of altering the timing and duration of the open and closed positions for intake valve 8 and exhaust valve 9 may be employed.

A hydraulically operated wastegate valve 11 operatively connected between the exhaust manifold 5 and the turbine 7 may be movable between an open position 13 and a closed position 12 at which fluid flow, such as, exhaust gas, exhausted by the engine 3 is restricted from bypassing the turbine 7. Hydraulically operated wastegate valve 11 may bypass exhaust fluid flow at the open position 13 and at positions between the open position 13 and the closed position 12. Because the wastegate may be infinitely variable, positions between the open position 13 and the closed position 12 determine different bypass characteristics. Hydraulically operated wastegate valve 11 may be positioned upstream of an inlet side 14 of the turbine 7 and disposed in a bypass conduit 15 which is teed into the exhaust ducting 16 downstream of the turbine 7. The bypass conduit may be connected to the exhaust manifold 5 in parallel with the turbine 7. Exhaust gasses bypassed by hydraulically operated wastegate valve 11 may be directed by the bypass conduit 15 around the turbine 7 and into exhaust ducting 16, for example, at a location adjacent muffler 17.

A first sensor 18 may be employed for sensing a parameter indicative of actuation of intake valve 8 and/or exhaust valve 9 and generating a first signal in response thereto. For example, the sensor 18 may sense the position, in particular, opening and closing, of intake valve 8 and/or exhaust valve 9 and deliver a responsive signal via a first conductor 19 connected between intake valve 8 and exhaust valve 9 and controller 20.

A second sensor 21 may be employed for detecting a parameter indicative of a speed of the turbocharger 2 and generating a second signal in response thereto. For example, the second sensor 21 may include one or more suitable speed sensors connected to turbocharger 2. Alternatively, second sensor 21 may include one or more virtual sensors to generate a turbocharger speed value based on values of input parameters sensed by one or more physical sensors. The second signal may be delivered to controller 20 via second conductor 22.

The controller 20 may be connected to the first sensor 18 via first conductor 19 for receiving intake valve 8 and exhaust valve 9 position signals and may be connected to the second sensor 21 via second conductor 22 for receiving turbocharger 2 speed signals. The controller 20 may include, for example, a processor 23, a memory 24, and a driver 25 for driving an operator 26. The controller 20 may be responsive to the position signal from first sensor 18 and the speed signal from second sensor 21 and may deliver a responsive control signal to operator 26.

The operator 26 may be configured to receive the control signal and responsively actuate hydraulically operated wastegate valve 11 toward one of the open position 13 and the closed position 12 and to a position between the open position 13 and the closed position 12, and thereby change the speed of the turbocharger 2, and thus, the amount of boost delivered to the intake manifold 4 of engine 3.

Figure 2:
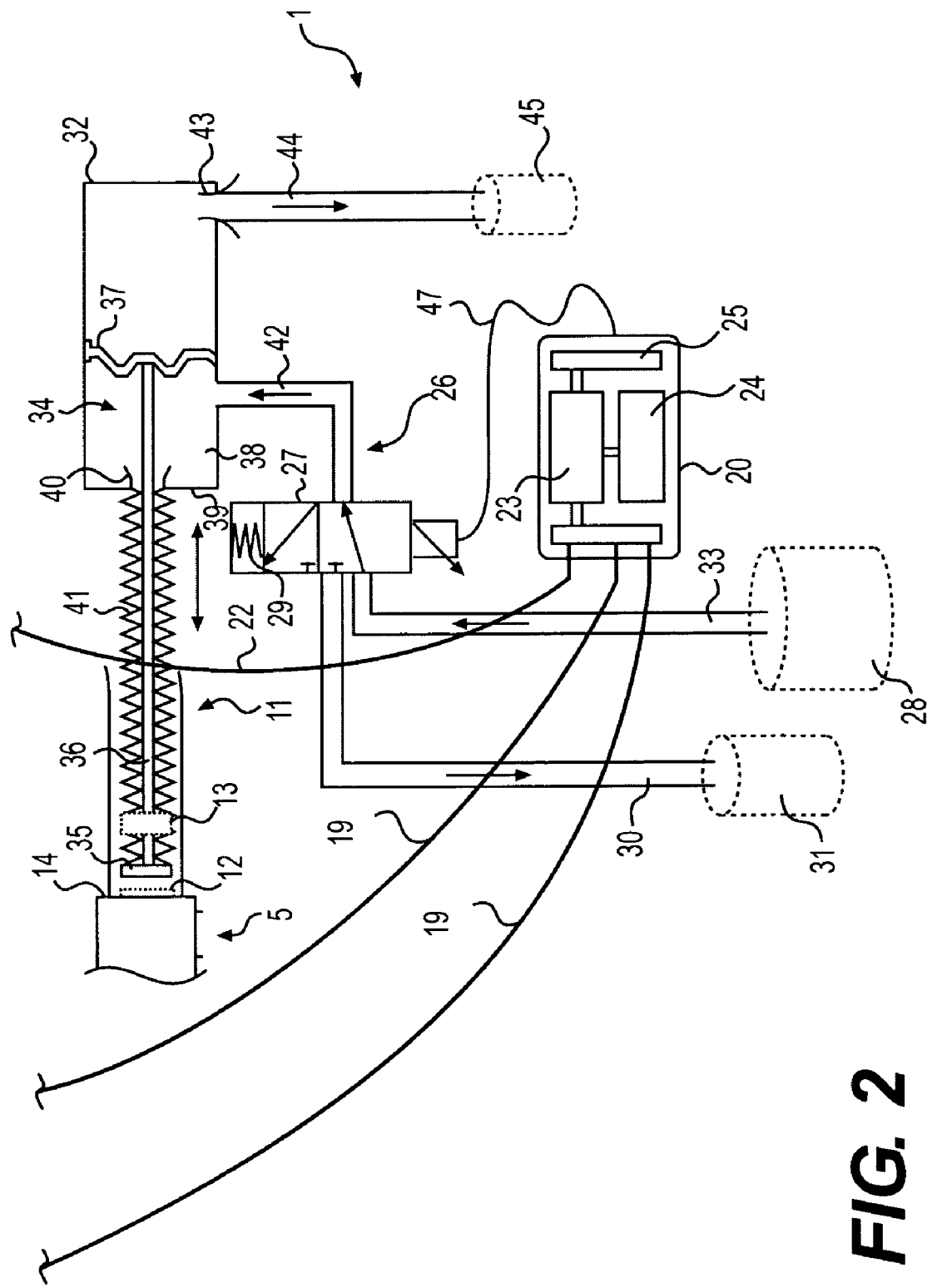
FIG. 2 is a diagrammatic illustration of a control system for use with the engine of FIG. 1 according to an exemplary disclosed embodiment.

Operator 26 and hydraulically operated wastegate valve 11 are diagrammatically shown in FIG. 2. As described above, operator 26 may be configured to receive a control signal from controller 20 via conductor 47 and responsively actuate hydraulically operated wastegate valve 11. Operator 26 may include a hydraulic control valve 27, such as a solenoid valve, in fluid communication with an engine oil pressure source 28, or any other pressurized fluid source, such as, pressurized air or lubrication oil, via communication line 33. An energy storage device, such as spring 29, may bias hydraulic control valve 27 in a closed position and a communication line 30 from hydraulic control valve 27 may direct excess, lower pressure oil to an oil sump 31. As shown in FIG. 2, hydraulic control valve 27 may be actuated to an open position and configured to regulate engine oil pressure to hydraulically operated wastegate valve 11 as operator 26 receives a control signal from controller 20.

Hydraulically operated wastegate valve 11 may include a hydraulic cylinder 32 in fluid communication with hydraulic control valve 27 via communication line 42, a piston 34 having a piston head 35 and a piston rod 36, and a diaphragm 37. Piston rod 36 may be slidably disposed and axially movable within hydraulic cylinder 32 and engaged with diaphragm 37. Diaphragm 37 may be in a sealing engagement with hydraulic cylinder 32 and piston rod 36 and defines a chamber 38 in hydraulic cylinder 32. An end 39 of hydraulic cylinder 32 may have a sealed opening 40 of a preselected diameter therein. Piston rod 36 may have a preselected diameter and extend through opening 40. An energy storage device, such as spring 41, may be provided between end 39 of hydraulic cylinder 32 and piston head 35, biasing piston 34 to a closed position against exhaust manifold 5, for example, upstream of the turbine 7.

As hydraulic control valve 27 directs engine oil from pressure source 28 through communication line 33 and to hydraulically operated wastegate valve 11, engine oil pressure in communication line 42 and chamber 38 may act on diaphragm 37 and cause piston rod 36 and piston 34 to move relative to hydraulic cylinder 32. A bleed orifice 43 may be configured to expel excess, lower pressure oil through communication line 44 and into oil sump 45 as engine oil pressure acts on diaphragm 37. Sump 31 and sump 45 may be a common sump. The movement of piston rod 36 and piston 34 may cause the hydraulically operated wastegate valve 11 to move between the open position 13 and the closed position 12. The difference between the force caused by the fluid pressure acting on the piston 34 and diaphragm 37 and the force of spring 41 determines the location of piston rod 36 and the position of piston 34. The controller 20, in delivering a control signal to operator 26, may establish a control pressure in chamber 38 and thereby determine wastegate valve 11 position.

INDUSTRIAL APPLICABILITY

The disclosed hydraulically operated wastegate valve control system 1 may be applicable to internal combustion engines having variable valve actuation. Because the opening and closing of intake valve 8 and exhaust valve 9 may vary depending on engine 3 operation and performance, boost pressure may vary independently of the speed of the turbocharger 2. For example, variable timing of the opening or closing of intake valve 8 or exhaust valve 9 may result in a condition wherein both the intake valve 8 and the exhaust valve 9 are open. Exhaust gasses exiting exhaust valve 9 and passing through exhaust manifold 5 may be directed to the turbine 7 of the turbocharger 2, increasing the speed of the turbocharger 2 and producing compressed air via compressor 6. The compressed air or boost air may then be directed to intake manifold 4. Because intake valve 8 may also be open, boost air directly enters intake valve 8 and the presence of boost air pressure within intake manifold 4 is limited.

Hydraulically operated wastegate valve control system 1 may therefore regulate the speed of the turbocharger 2 in the absence of boost pressure by employing engine oil as a working fluid to actuate hydraulically operated wastegate valve 11 in response to intake valve 8 and exhaust valve 9 actuation. The control system 1, in utilizing the positions of intake valve 8 and exhaust valve 9 as a control parameter, achieves improved performance of engine 3 with variable valve actuation and compensates for periods of insufficient boost air pressure.

In operation, control system 1 may control the speed of the turbocharger 2, and thus intake manifold 4 boost pressure by sensing position signals of intake valve 8 and exhaust valve 9 and controlling hydraulically operated wastegate valve 11 based on the signals and in accordance with preprogrammed instructions. The controller 20 may determine a target turbocharger speed value based on the positions of intake valve 8 and exhaust valve 9 and the turbocharger speed, and a turbocharger speed error between the actual turbocharger speed value and the target turbocharger speed value, and then change the turbocharger speed by controlling the hydraulically operated wastegate valve 11 and the bypassing of exhaust gasses.

Figure 3:
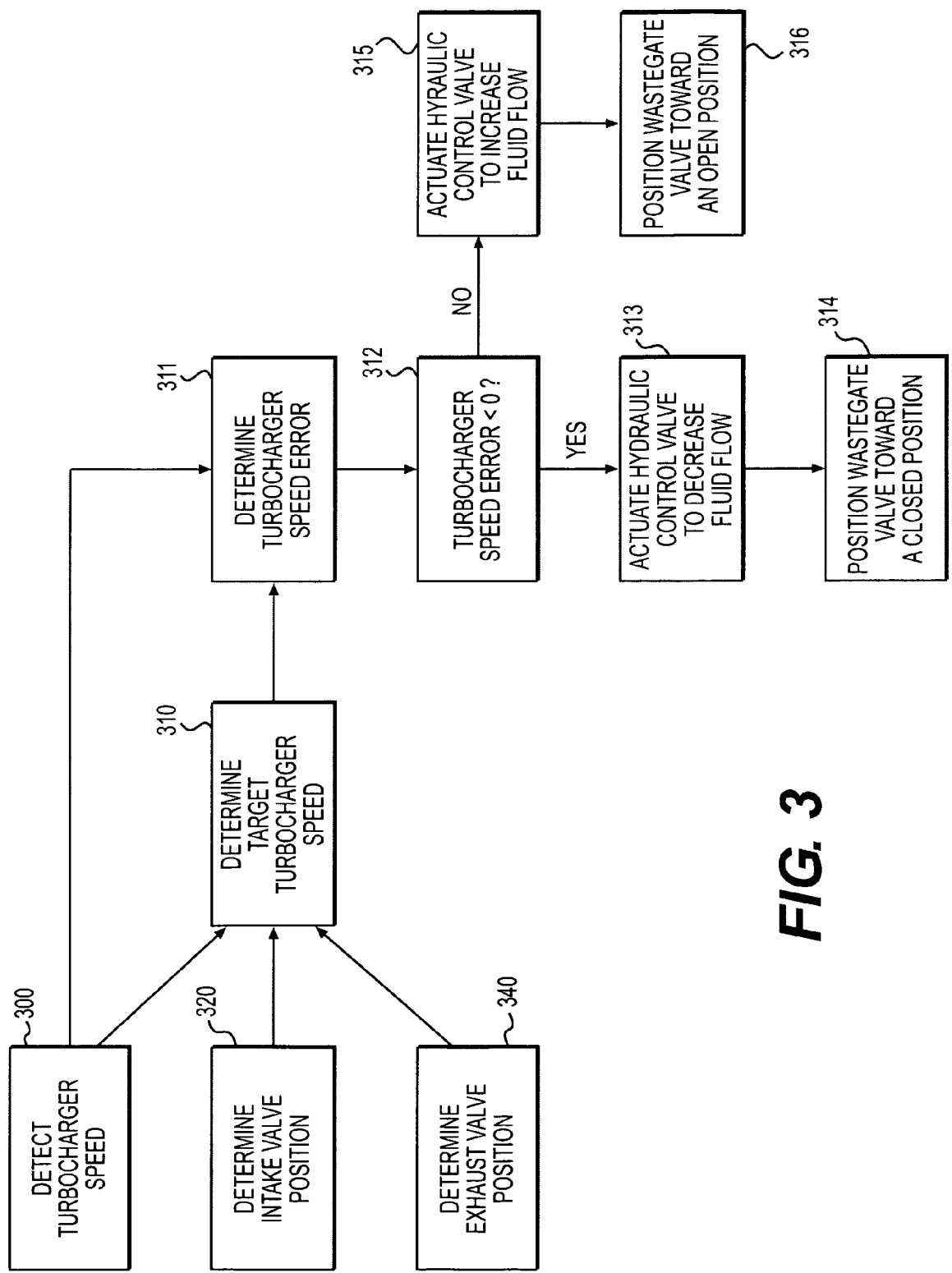
FIG. 3 is a flow chart showing the control system control logic according to an exemplary disclosed embodiment.

FIG. 3 is a block diagram illustrating an embodiment of how processor 23 may determine target turbocharger speed, for example, by selecting a target turbocharger speed value from a turbocharger speed map 310 (or lookup table) based on the positions of intake valve 8 and exhaust valve 9, box 320 and 340, respectively, and turbocharger speed, box 300. Processor 23 (referring back to FIGS. 1 and 2) determines turbocharger speed error in box 311 as the difference between actual and target turbocharger speed values (Turbocharger Speed$_{actual}$−Turbocharger Speed$_{target}$=Turbocharger Speed$_{error}$). The actual turbocharger speed, box 300, is the speed being detected by second sensor 21 and delivered to processor 23.

If the turbocharger speed error is negative in box 312, for example, actual turbocharger speed value is less than target turbocharger speed value, controller 20 may deliver the control signal to operator 26 and cause hydraulic control valve 27 to drain engine oil from hydraulic cylinder 32 through communication line 42, decreasing fluid flow to hydraulically operated wastegate valve 11, box 313, and moving hydraulically operated wastegate valve 11 toward a closed position, box 314, at which an appropriate amount of exhaust flow is bypassed to the turbine 7. If the turbocharger speed error is positive in box 312, for example, actual turbocharger speed value is greater than target turbocharger speed value, controller 20 may deliver the control signal to operator 26 and cause hydraulic control valve 27 to add engine oil to hydraulically operated wastegate valve 11 through communication line 42, increasing fluid flow to hydraulically operated wastegate valve 11, box 315, and moving hydraulically operated wastegate valve 11 toward an open position, box 316, at which an appropriate amount of exhaust flow is bypassed through wastegate valve 11 and downstream of the turbine 7.

Because hydraulically operated wastegate valve control system 1 may employ engine oil as a working fluid to actuate hydraulically operated wastegate valve 11 in response to intake valve 8 and exhaust valve 9 actuation, the speed of the turbocharger 2 may be regulated in systems in which boost air pressure is absent or insufficient, such as, internal combustion engines having variable valve actuation.

It will be apparent to those skilled in the art that various modifications and variations can be made to the hydraulically operated wastegate valve control system of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A method for controlling turbocharger speed of a turbocharged internal combustion engine, the engine including a compressor section associated with an intake valve for intake air, a turbine section associated with an exhaust valve for engine exhaust, and a variable valve actuation mechanism configured to variably actuate at least one of the intake valve and the exhaust valve, the method comprising:
   sensing actuation of at least one of the intake valve and the exhaust valve by the variable valve actuation mechanism and generating a first signal in response thereto;
   detecting turbocharger speed and generating a second signal in response thereto;
   generating a control signal based on a predetermined relationship between the first signal and the second signal; and
   controlling actuation of a hydraulically operated wastegate valve based on the control signal.

2. The method of claim 1, wherein the sensing actuation of at least one of the intake valve and the exhaust valve further includes determining respective positions of the intake valve and the exhaust valve.

3. The method of claim 1, wherein the controlling actuation of the hydraulically operated wastegate valve further includes actuating a hydraulic control valve in communication with an engine oil pressure source.

4. The method of claim 3, further including controlling a flow of engine oil from the engine oil pressure source to the hydraulically operated wastegate valve by variably permitting flow of engine oil to the wastegate valve.

5. The method of claim 4, further including directing engine oil pressure to a hydraulic cylinder and against a diaphragm to move the hydraulically operated wastegate valve toward an open position.

6. The method of claim 4, further including biasing the hydraulically operated wastegate valve toward a closed position with an energy storage device.

7. A hydraulically operated wastegate valve control system for a turbocharged internal combustion engine including a compressor section associated with an intake valve for intake air, a turbine section associated with an exhaust valve for engine exhaust, and a variable valve actuation mechanism configured to variably actuate at least one of the intake valve and the exhaust valve, the control system comprising:
   a hydraulically operated wastegate valve configured to permit engine exhaust to bypass the turbine section;
   a first sensor configured to sense an actuation of at least one of the intake valve and the exhaust valve by the variable valve actuation mechanism and generate a first signal in response thereto;

a second sensor configured to detect a turbocharger speed and generate a second signal in response thereto;

a controller associated with the first sensor and the second sensor, the controller configured to deliver a control signal based on a predetermined relationship between the actuation of at least one of the intake valve and the exhaust valve by the variable valve actuation mechanism and the turbocharger speed; and an operator configured to receive the control signal and control an actuation of the hydraulically operated wastegate valve based on the control signal.

8. The control system of claim 7, wherein the controller includes a processor, the processor configured to determine a target turbocharger speed value based on the first signal and the second signal and select the target turbocharger speed value from a turbocharger speed value map, the turbocharger speed value map relating the turbocharger speed and the actuation of at least one of the intake valve and the exhaust valve.

9. The control system of claim 7, wherein the first signal is indicative of a position of one of the intake valve and the exhaust valve.

10. The control system of claim 7, wherein the operator further includes a hydraulic control valve in fluid communication with an engine oil pressure source.

11. The control system of claim 10, wherein the hydraulic control valve is configured to control a flow of engine oil to and from the hydraulically operated wastegate valve in response to the control signal from the controller.

12. The control system of claim 11, wherein the hydraulically operated wastegate valve is positioned on an inlet side of the turbine section.

13. The control system of claim 12, wherein the hydraulically operated wastegate valve includes a diaphragm disposed within a hydraulic cylinder in fluid communication with the hydraulic control valve, a piston engaged with the diaphragm and movable with respect to the inlet side, and an energy storage device engaged with the piston and configured to bias the piston toward the inlet side and a closed position.

14. The control system of claim 13, wherein the hydraulic control valve is configured to direct engine oil to the hydraulic cylinder with sufficient pressure to overcome a biasing force of the energy storage device and move the piston toward an open position.

15. The control system of claim 13, wherein the hydraulic control valve is configured to regulate the flow of engine oil from the engine oil pressure source to the hydraulic cylinder, and the energy storage device is a spring configured to move the piston toward the closed position when the hydraulic control valve drains engine oil from the hydraulic cylinder.

16. An internal combustion engine assembly, comprising:
an intake valve;
an exhaust valve;
a variable valve actuation mechanism configured to variably actuate at least one of the intake valve and the exhaust valve;
an intake manifold and an exhaust manifold respectively connected to a compressor section and a turbine section of a turbocharger; and
a hydraulically operated wastegate valve control system, the control system including:
a hydraulically operated wastegate valve configured to permit engine exhaust to bypass the turbine section;
a first sensor configured to sense an actuation of at least one of the intake valve and the exhaust valve by the variable valve actuation mechanism and generate a first signal in response thereto;
a second sensor configured to detect a turbocharger speed and generate a second signal in response thereto;
a controller associated with the first sensor and the second sensor, the controller configured to deliver a control signal based on a predetermined relationship between the actuation of at least one of the intake valve and the exhaust valve by the variable valve actuation mechanism and the turbocharger speed; and
an operator configured to receive the control signal and control actuation of the hydraulically operated wastegate valve based on the control signal.

17. The engine assembly of claim 16, wherein the controller includes a processor, the processor configured to determine a target turbocharger speed value based on the first signal and the second signal and select the target turbocharger speed value from a turbocharger speed value map, the turbocharger speed value map relating the turbocharger speed and the actuation of at least one of the intake valve and the exhaust valve.

18. The engine assembly of claim 17, wherein the operator includes a hydraulic control valve configured to control a flow of engine oil to and from the hydraulically operated wastegate valve in response to the control signal from the controller.

19. The engine assembly of claim 18, wherein the hydraulically operated wastegate valve includes a diaphragm disposed within a hydraulic cylinder in fluid communication with the hydraulic control valve, a piston engaged with the diaphragm, and an energy storage device engaged with the piston and configured to bias the piston toward a closed position.

20. The engine assembly of claim 19, wherein the hydraulic control valve is configured to direct engine oil to the hydraulic cylinder and against the diaphragm to overcome the bias of the energy storage device and move the piston toward an open position, and is configured to variably permit the flow of engine oil to and from the hydraulic cylinder to permit the energy storage device to bias the piston toward the closed position.

* * * * *